United States Patent Office 3,838,127
Patented Sept. 24, 1974

3,838,127
4-[4-(HYDROXYALKYL)-1-PIPERAZINO]-
QUINAZOLINE BENZOATES
William R. Simpson, Mendham, N.J., assignor to
Sandoz-Wander, Inc., Hanover, N.J.
No Drawing. Filed Oct. 19, 1972, Ser. No. 299,073
Int. Cl. C07d 51/48
U.S. Cl. 260—256.4 Q          7 Claims

ABSTRACT OF THE DISCLOSURE

Disclosed are 4-[4-(hydroxyalkyl) - 1 - piperazino]-quinazoline benzoates, e.g., 4-[4-(2-hydroxyethyl)-1-piperazino]-2-methyl-6,7-dimethoxy-quinazoline 3',4',5'-trimethoxybenzoate. The compounds have pharmacological activities in animals and are useful, for example, as anti-anginal agents and/or as agents in the treatment of shock.

---

This invention relates to quinazoline derivatives, and more particularly to 4-[4-(hydroxyalkyl)-1-piperazino]-quinazoline methoxybenzoates. The invention also relates to pharmaceutical methods and compositions utilizing said compounds.

The compounds of the invention may be represented by the structural formula I:

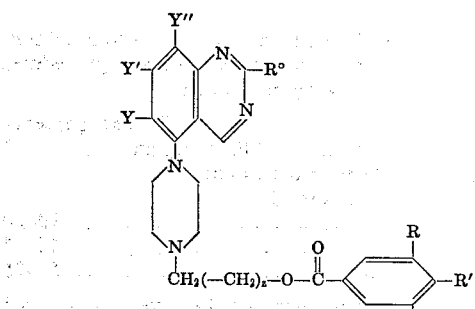

wherein

R° is hydrogen or alkyl of 1 to 4 carbon atoms,
each of Y, Y', and Y" is hydrogen or alkoxy of 1 to 3 carbon atoms, provided at least two of Y, Y' and Y" are alkoxy, or Y and Y' together form alkylenedioxy of 1 or 2 carbon atoms,
each of R, R' and R" is hydrogen or alkoxy of 1 to 3 carbon atoms, provided at least two of R, R' and R" are alkoxy, and
z is 1 to 4, or a pharmaceutically acceptable non-toxic acid addition salt thereof.

The compounds of the formula I may be prepared in a Step A reaction involving reacting a compound of the formula II:

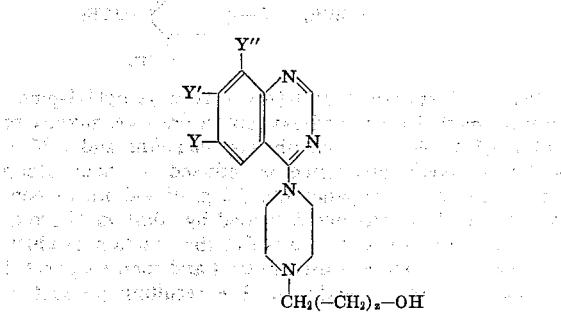

wherein Y, Y', Y" and z are as above defined, with a compound of the formula III:

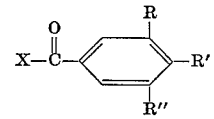

wherein R, R' and R" are as above defined and X is chloro or bromo.

The reaction of Step A may be suitably carried out at temperatures in the range of from 10° C. to 100° C., preferably 25° C. to 60° C. The reaction is preferably carried out in the presence of an inert organic solvent which may be of conventional type, for example, a chlorine-containing hydrocarbon such as methylene chloride. An acid binding agent of conventional type such as a tertiary organic amine, e.g., triethylamine, is also preferably employed. The reaction product of the formula I may be recovered from the reaction mixture of Step A by working up by conventional procedures.

A preferred method for preparation of compounds II involves a Step B reaction of a 4-haloquinazoline of formula IV:

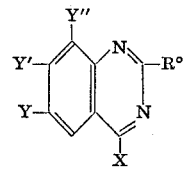

wherein Y, Y', Y", R° and X are as defined, with a compound of formula V:

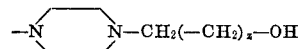

wherein z is as defined.

The reaction of Step B is of known type and may be carried out in a conventional manner by subjecting a compound IV to reaction with the compound V at elevated temperatures which may be suitably in the range of 30° C. to 180° C., preferably 60° C. to 160° C. The reaction may be suitably carried out in an inert organic solvent which may be any of several of the well-known conventional solvents, preferably an aromatic solvent such as benzene. Another preferred solvent is isopropanol. Alternately, the reaction may be initiated and/or carried out in the inert liquid medium provided by employing an excess of compound V when the compound is liquid at the reaction temperature or by fusion of solid reactants. An acid binding agent such as sodium carbonate may be also employed to advantage in the reaction, if desired. The reaction product compound II may be isolated from the reaction mixture of Step B by established procedures.

The compounds of formulae II, III, IV and V are either known or may be prepared from known materials by established procedures, for example, as described in U.S. Letters Patent Nos. 3,637,699, 3,637,700 and 3,637,701.

Also within the scope of the novel compounds of the invention are pharmaceutically acceptable salts not materially affecting the pharmacological effect of the compounds of formula I. Such salts include the acid addition salts, e.g., the methane sulfonate, hydronitrate, hydrosulfate, fumarate, hydrochloride and maleate. Such salts may be prepared by conventional procedures from the free bases and the salts may be readily converted to the free bases by conventional procedures.

The compounds of formula I and their pharmaceutically acceptable acid addition salts are useful because they possess pharmacological activity in animals. In particular, the compounds of the formula I are useful as antianginal agents as indicated by effecting coronary dilation in the anesthetized dog on intravenous administration (0.5 to 20 mg./kg.) and measurement of blood flow through the anterior descending branch of the left coronary artery.

The compounds of the formula I having the formula Ia:

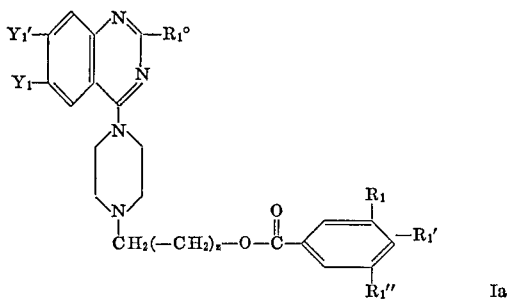

wherein $R_1°$ is alkyl of 1 to 4 carbon atoms, each of $Y_1$ and $Y_1'$ is alkoxy of 1 to 3 carbon atoms and each of $R_1$, $R_1'$ and $R_1''$ is alkoxy of 1 to 3 carbon atoms are also useful as agents in the treatment of myocardial shock (positive inotropic effect) as indicated on intravenous administration (0.5 to 20 milligrams per kilogram) to the anesthetized dog and measuring the myocardial contractile force with a Walton Brodie strain gauge.

For the above uses, the compounds of the formula I may be combined with a pharmaceutically acceptable carrier, and such other conventional adjuvants as may be necessary, and administered orally in such forms as tablets, capsules, elixirs, suspensions and the like or parenterally in the form of an injectable solution or suspension. For the above-mentioned uses, the dosage administered will, of course, vary depending upon the compounds used, the therapy desired and the mode of administration. However, as anti-anginal agents, satisfactory results may be obtained when administered at a daily dosage of from 0.2 to 100 milligrams per kilogram of body weight, given as required or in divided doses or in sustained release form. For most larger mammals a dosage of from 16 to 500 milligrams, pro re nata, provides satisfactory results. The compounds may also be used prophylactically in mammals to prevent or minimize angina attacks at a daily dosage of 16 to 500 milligrams, or in divided doses of from 4 to 250 milligrams. In use as anti-anginal agents oral administration is generally preferred.

For the treatment of myocardial shock the compounds of the formula Ia may be effectively administered at a dosage of from 0.004 to 40 milligrams per kilogram of animal body weight, pro re nata. For most larger mammals satisfactory results are obtained on the administration of from 0.3 to 50 milligrams, pro re nata. For such usage the compounds of the formula Ia are preferably administered parenterally, e.g., intravenously. A preferred compound for use in the treatment of shock is the compound of Example 1 hereinafter.

For the above usages, oral administration with carriers may take place in such conventional forms as tablets, dispersible powders, granules, capsules, syrups and elixirs. Such compositions may be prepared according to any method known in the art for the manufacture of pharmaceutical compositions, and such compositions may contain one or more conventional adjuvants, such as sweetening agents, flavoring agents, coloring agents and preserving agents, in order to provide an elegant and palatable preparation. Tablets may contain the active ingredient in admixture with conventional pharmaceutical excipients, i.e., inert diluents such as calcium carbonate, sodium carbonate, lactose and talc, granulating and disintegrating agents, e.g., starch and alginic acid, binding agents, e.g., starch, gelatin and acacia, and lubricating agents, e.g., magnesium stearate, stearic acid and talc. The tablets may be uncoated or coated by known techniques to delay disintegration and adsorption in the gastro-intestinal tract and thereby provide a sustained action over a longer period. Similarly, suspensions, syrups and elixirs may contain the active ingredient in admixture with any of the conventional excipients utilized for the preparation of such compositions, e.g., suspending agents (methylcellulose, tragacanth and sodium alginate), wetting agents (lecithin, polyoxyethylene stearate and polyoxyethylene sorbitan monooleate) and preservatives (ethyl-p-hydroxybenzoate). Capsules may contain the active ingredient alone or admixed with an inert solid diluent, e.g., calcium carbonate, calcium phosphate and kaolin. Except for the use in the treatment of shocks the preferred pharmaceutical compositions from the standpoint of preparation and ease of administration are solid compositions, particularly hard-filled gelatin capsules and tablets.

A representative formulation is a tablet prepared by conventional tabletting techniques and containing the following ingredients:

| Ingredients: | Weight (mg.) |
|---|---|
| Compound of Example 2(e) | 50 |
| Tragacanth | 10 |
| Lactose | 197.5 |
| Corn starch | 25 |
| Talcum | 15 |
| Magnesium stearate | 2.5 |

Compositions for parenteral administration for use, for example, in the treatment of shocks, may be formulated by well-known methods to contain an effective amount of a compound Ia as active ingredient in a conventional inert carrier or suspension or solvent medium, together with other additives such as dispersing agents, wetting agents, buffering agents and other conventional ingredients, as desired.

A representative formulation for intravenous administration is a solution prepared by standard procedures and containing the following ingredients:

| Ingredient: | Weight (percent) |
|---|---|
| Compound of Example 1 (10 milligrams) | 5 |
| Sodium chloride to make isotonic. | |
| Buffer Agent to adjust pH. | |
| Ethanol, U.S.P. | 10–20 |
| Propylene Glycol | 15–25 |
| Water for Injection | 55–75 |

In general, the compositions of the invention adapted for either oral or parenteral administration may contain 1% to 90% by weight of the active ingredient in combination with the inert carrier, more usually 3% to 40%.

The following examples are given for the purpose of illustration only.

EXAMPLE 1

4-[4-(2-hydroxyethyl)-1-piperazino]-2-methyl-6,7-dimethoxyquinazoline 3',4',5'-trimethoxybenzoate

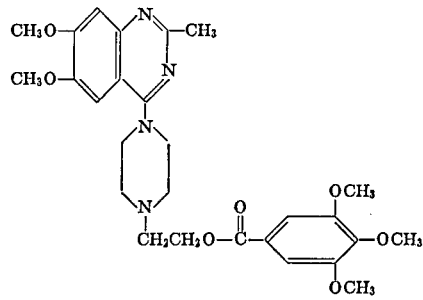

Step A: Preparation of 4-[4-(2-hydroxyethyl)-1-piperazino]-2-methyl-6,7-dimethoxyquinazoline.—A mixture of 4.67 g. of 4-chloro-6,7-dimethoxyquinazoline and 2.86 g. of 2-hydroxyethylpiperazine is refluxed ½ hour along with 15 ml. of isopropanol and 3.2 g. of sodium carbonate. The resulting mixture is treated by addition of methanol and then heated to redissolve the reaction product. The reaction mixture is then filtered and then evaporated in vacuo to remove methanol. The resulting product is then purified by chromatography on 50 g. silica gel using chloroform as eluant to obtain 4-[4-(2-hydroxyethyl)-1-piperazino]-2-methyl - 6,7 - dimethoxyquinazoline, m.p. 156.5–158° C.

The free base above obtained in an amount of 2.0 g. is treated in methanol with hydrogen chloride to obtain a dihydrochloride salt which was redissolved with water followed by treatment with charcoal and evaporation in vacuo to a minimum volume. The residue was treated with isopropanol to obtain 4-[4-(2-hydroxyethyl-1-piperazino]- 2 -methyl-6,7-dimethoxyquinazoline dihydrochloride monohydrate, m.p. 251° C. (with decomp.).

Step B: Preparation of 4-[4-(2-hydroxyethyl)-1-piperazino]-2-methyl-6,7-dimethoxyquinazoline 3',4',5'-trimethoxybenzoate.—To a solution of 1.36 g. of 4-[4-(2-hydroxyethyl)-1-piperazino-2-methyl - 6,7 - dimethoxyquinazoline in 15 ml. of methylene chloride is added 0.63 ml. of triethylamine and then 1.14 g. of 3,4,5-trimethoxybenzoyl chloride at about room temperature. The resulting mixture is stirred for ½ hour at room temperature and then for 1 hour at 30–40° C. The reaction mixture is then diluted to 75 ml. with methylene chloride and washed twice with 50 ml. of water followed by drying and evaporation in vacuo. The resulting oil is dissolved in 75 ml. of diethyl ether, the solution filtered and hydrogen chloride saturated ethanol is added dropwise. The resulting crystals are recrystallized from absolute ethanol/diethyl ether (1:1) and dried under high vacuum at 40° C. to obtain 4-[4-(2-hydroxyethyl)-piperazino]-2-methyl-6,7-dimethoxyquinazoline 3',4',5'-trimethoxybenzoate dihydrochloride hydrate, m.p. 218–221° C. (decomp.).

EXAMPLE 2

Following the procedure of Example 1 the following additional compounds of the invention are prepared:

(a) 4-[4-(2-hydroxyethyl)-1-piperazino]-6,7,8-trimethoxyquinazoline 3',4',5'-trimethoxybenzoate.
(b) 4-[4-(2-hydroxypropyl)-1-piperazino]-6,7,8-trimethoxyquinazoline 3',4'-dimethoxybenzoate.
(c) 4-[4-(2-hydroxyethyl)-1-piperazino]-6,7-dimethoxyquinazoline 3',4',5'-trimethoxybenzoate.
(d) 4-[4-(2-hydroxyethyl)-1-piperazino]-2-ethyl-6,7-dimethoxyquinazoline 3',4',5'-trimethoxybenzoate.
(e) 4-[4-(2-hydroxyethyl)-1-piperazino]-2-methyl-6,7,8-trimethoxyquinazoline 3',4',5'-trimethoxybenzoate dihydrochloride, m.p. 178–181° C. (decomp.).
(f) 4-[4-(2-hydroxyethyl)-1-piperazino]-2-methyl-6,7-methylenedioxyquinazoline 3',4',5'-trimethoxybenzoate.
(g) 4-[4-(2-hydroxyethyl)-1-piperazino]-2-methyl-6,7-ethylenedioxyquinazoline 3',4',5'-trimethoxybenzoate.

What is claimed is:
1. A compound of the formula
wherein

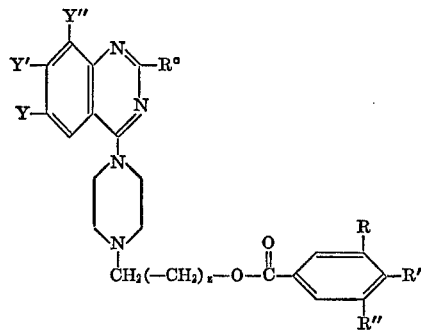

$R^\circ$ is hydrogen or alkyl of 1 to 4 carbon atoms,
each of Y, Y' and Y'' is hydrogen or alkoxy of 1 to 3 carbon atoms, provided at least two of Y, Y' and Y'' are alkoxy, or Y and Y' together from alkylenedioxy of 1 or 2 carbon atoms,
each of R, R' and R'' is hydrogen or alkoxy of 1 to 3 carbon atoms, provided at least two of R, R' and R'' are alkoxy, and
z is 1 to 4, or
a pharmaceutically acceptable non-toxic acid addition salt thereof.

2. A compound of claim 1 in which each of R, R' and R'' is methoxy.
3. A compound of claim 1 in which each of Y, Y' and Y'' is methoxy.
4. The compound of claim 2 in which each of Y, Y' and Y'' is methoxy, R° is methyl and z is 1.
5. A compound of claim 1 having the formula:

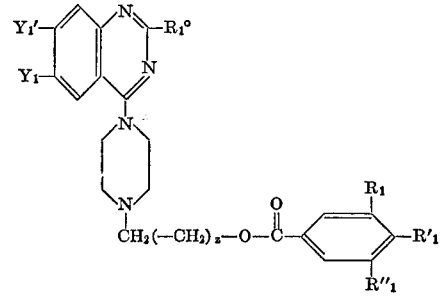

in which each of Y, $Y_1'$, $R_1$, $R_1'$ and $R_1''$ is alkoxy of 1 to 3 carbon atoms, $R_1^\circ$ is alkyl of 1 to 4 carbon atoms and z is as defined in claim 1.

6. A compound of claim 5 in which Z is 1.
7. The compound of claim 6 in which each of $Y_1$, $Y_1'$, $R_1$, $R_1'$ and $R_1''$ is methoxy and $R_1^\circ$ is methyl.

References Cited
UNITED STATES PATENTS
3,517,005   6/1970   Cronin et al. _____ 260—288 R NATALIE TROUSOF, Primary Examiner
S. D. WINTERS, Assistant Examiner U.S. Cl. X.R.
260—251 Q; 424—251